United States Patent
Bilyeu et al.

(10) Patent No.: US 7,492,267 B2
(45) Date of Patent: Feb. 17, 2009

(54) TRACKING METHODS AND SYSTEMS USING RFID TAGS

(76) Inventors: Suzanne Bilyeu, 6581 Pondfield La., Mason, OH (US) 45040; Scott A. Madding, 965 Bamburgh Dr., Maineville, OH (US) 45039

( * ) Notice: Subject to any disclaimer, the term of this patent is extended or adjusted under 35 U.S.C. 154(b) by 376 days.

(21) Appl. No.: 11/193,033

(22) Filed: Jul. 29, 2005

(65) Prior Publication Data
US 2007/0024449 A1    Feb. 1, 2007

(51) Int. Cl.
   *G08B 23/00* (2006.01)
(52) U.S. Cl. .............. 340/573.1; 340/572.1; 340/572.8; 340/568.1
(58) Field of Classification Search ............... 340/573.1, 340/568.1, 572.1, 998, 5.92, 522, 10.1, 5.31, 340/5.61, 505, 572.8; 273/292, 309
See application file for complete search history.

(56) References Cited

U.S. PATENT DOCUMENTS

| | | | |
|---|---|---|---|
| D261,614 S * | 11/1981 | Vallone | ................ D9/307 |
| 6,025,725 A | 2/2000 | Gershenfeld et al. | |
| 6,208,253 B1 | 3/2001 | Fletcher et al. | |
| 6,335,685 B1 | 1/2002 | Schrott et al. | |
| 6,348,864 B1 * | 2/2002 | Lin et al. | .................. 340/570 |
| 6,472,987 B1 | 10/2002 | Gershenfeld et al. | |
| 6,693,540 B2 | 2/2004 | Gershenfeld et al. | |
| 6,724,310 B1 | 4/2004 | Gershenfeld et al. | |
| 6,736,316 B2 | 5/2004 | Neumark | |
| 6,741,178 B1 * | 5/2004 | Tuttle | ................. 340/572.1 |
| 6,825,766 B2 | 11/2004 | Hewitt et al. | |
| 6,827,348 B1 * | 12/2004 | Mitchell | ................. 273/292 |
| 6,834,251 B1 | 12/2004 | Fletcher | |
| 6,883,710 B2 | 4/2005 | Chung | |
| 6,891,474 B1 | 5/2005 | Fletcher | |
| 7,015,811 B2 * | 3/2006 | Decker et al. | ......... 340/539.22 |
| 7,034,683 B2 * | 4/2006 | Ghazarian | ............... 340/568.1 |

(Continued)

OTHER PUBLICATIONS

Romer et al.; Smart Playing Cards: A Ubiquitous Computing Game; 10 pages; Switzerland.

*Primary Examiner*—Anh V La
(74) *Attorney, Agent, or Firm*—Kelly S. K. Elsea

(57) ABSTRACT

Systems and methods of using RFID tags for verifying and tracking articles are provided. A method of tracking articles for shipment comprises the steps of providing at least one article comprising a plurality of subarticles; applying an article radio frequency identification (RFID) tag to the article, wherein the article RFID tag stores information regarding the article, the subarticles in each article, or combinations thereof; packing the article into at least one package; applying a package RFID tag to the package, wherein the package RFID tag stores information regarding the package, the articles in the package, the subarticles in each article, or combinations thereof; and verifying the package and/or article by scanning the respective RFID tags with at least one RFID verification device configured to read RFID tags.

38 Claims, 2 Drawing Sheets

U.S. PATENT DOCUMENTS

| | | |
|---|---|---|
| 2002/0038267 A1 | 3/2002 | Can et al. |
| 2002/0147042 A1 | 10/2002 | Vuong et al. |
| 2003/0034390 A1 | 2/2003 | Linton et al. |
| 2004/0074964 A1 | 4/2004 | Falkenrich-Wesche |
| 2004/0088231 A1 | 5/2004 | Davis, Jr. |
| 2004/0099736 A1 | 5/2004 | Neumark |
| 2004/0102870 A1 | 5/2004 | Andersen et al. |
| 2004/0207156 A1 | 10/2004 | Soltys et al. |
| 2005/0026680 A1 | 2/2005 | Guruajan |
| 2005/0054408 A1 | 3/2005 | Steil et al. |
| 2005/0060171 A1 | 3/2005 | Molnar |
| 2005/0060246 A1 | 3/2005 | Lastinger et al. |
| 2005/0062226 A1 | 3/2005 | Schubert et al. |
| 2005/0065861 A1 | 3/2005 | Bann |
| 2005/0080680 A1 | 4/2005 | Elam et al. |
| 2005/0097010 A1 | 5/2005 | Carrender |

\* cited by examiner

TRACKING METHODS AND SYSTEMS USING RFID TAGS

FIELD OF THE INVENTION

The present invention is generally directed to systems and methods of tracking articles using radio frequency identification (RFID) tags, and specifically to systems and methods of tracking utilizing RFID tags in articles, packages and/or package skids.

BACKGROUND OF THE INVENTION

In recent years, the tracking and verifying of articles has evolved through the use of RFID tags. In retail applications, RFID tags can contain security and/or verification information and are typically attached to an article for purchase. The RFID tags can store information regarding the article, for example the source or authenticity of the article, and can be used in inventory control systems. RFID verification devices, which are generally located inside a store or a warehouse, can read the RFID tag, and determine the location of an article and/or information regarding the article.

Increasing numbers of manufacturers and sellers have begun incorporating RFID tags into articles for various purposes, including, but not limited to inventory control, security, and purchaser information gathering.

SUMMARY OF THE INVENTION

According to one embodiment of the present invention, a method of tracking articles for shipment is provided. The method comprises the steps of: providing at least one article, wherein the article comprises a plurality of subarticles; applying a radio frequency identification (RFID) tag to the article, wherein the article RFID tag stores information regarding the article, the subarticles in the article, or combinations thereof; packing at least one article into at least one package; applying an RFID tag to the package, wherein the package RFID tag stores information regarding the package, the article in the package, the subarticles in the article, or combinations thereof; and verifying the package and/or article by scanning the respective RFID tags with at least one RFID verification device configured to read RFID tags.

According to a second embodiment of the present invention, a method for tracking articles upon delivery to an end user is provided. The method comprises the steps of: receiving from a shipping container at least one package skid, wherein each package skid comprises at least one package, each package comprises a plurality of articles, and each article comprises a plurality of subarticles therein. The package skid, the packages, and the articles each comprise at least one radio frequency identification (RFID) tag. The method further includes scanning the package skid RFID tag on each package skid removed from the shipping container with an RFID verification device configured to scan RFID tags; scanning the package RFID tag on each package removed from the scanned package skid with an RFID verification device; and scanning the article RFID on each article removed from the scanned package with an RFID verification device.

According to a third embodiment of the present invention, a method for monitoring playing card movement in a casino is provided. The method comprises the steps of providing at least one playing card box comprising at least one deck of playing cards therein, wherein the playing card comprises at least one radio frequency identification (RFID) tag; and scanning the RFID tag on the playing card box as the playing cards are delivered to a casino table with an RFID verification device configured to scan RFID tags.

According to a fourth embodiment, a system for monitoring playing cards in a casino is provided. The system comprises a casino unloading radio frequency identification (RFID) verification device operable to scan an RFID tag on a package skid containing packages of playing card boxes having playing cards therein, as a package skid is removed from a shipping container and received at a casino unloading location. The system also comprises a casino warehouse verification device operable to scan an RFID tag on a package skid, package and/or playing card boxes entering or exiting a casino warehouse; a casino pit RFID verification device operable to scan an RFID tag on a playing card box entering or exiting a casino pit; a casino table RFID verification device, wherein the RFID verification device is operable to scan an RFID tag on a playing card box as playing cards are removed from a playing card box and put into use; and a destruction RFID verification device operable to scan an RFID tag on a playing card box prior to or as the playing card box is destroyed.

According to a fifth embodiment, a radio frequency identification (RFID) system is provided. The RFID system comprises a package skid comprising an RFID tag, wherein the package skid RFID tag is operable to be scanned by an RFID verification device configured to scan RFID tags. The system also comprises at least one package located on the package skid and comprising an RFID tag, wherein the package RFID tag is operable to be scanned by an RFID verification device configured to scan RFID tags, and at least one article located in the package and comprising an RFID tag, wherein the article RFID tag is operable to be scanned by an RFID verification device.

The RFID methods and systems of the present invention are advantageous, especially in the ability to track articles prior to shipment and through use, for example, in the case of articles comprising decks of playing cards, until the articles are destroyed. These and additional objects and advantages provided by the systems and methods of the present invention will be more fully understood in view of the following detailed description.

BRIEF DESCRIPTION OF THE DRAWINGS

The following detailed description of specific embodiments of the present invention can be best understood when read in conjunction with the drawings in which.

DETAILED DESCRIPTION

Figure 1:
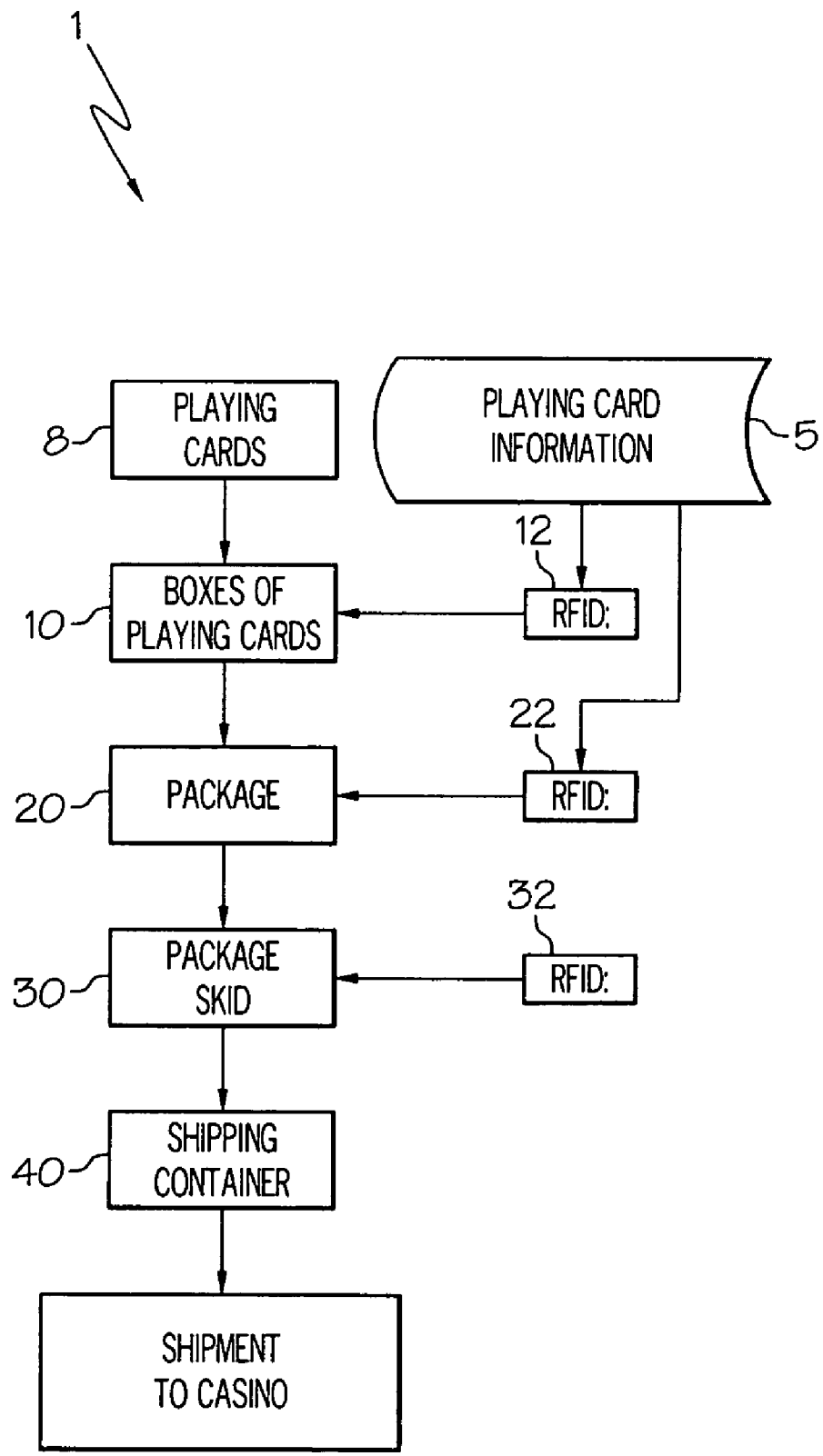
FIG. 1 is a flow chart illustrating the tracking of playing cards using RFID tags prior to shipment to a casino location, according to one or more embodiments of the present invention.

The present invention is directed to systems and methods of tracking articles using RFID tags in articles, packages, package skids, or combinations thereof. The methods and systems of the present invention may track or monitor the movement of articles, for shipment, upon delivery and/or throughout the product life of the article. The RFID tags facilitate tracking of the articles, for example, prior to shipment, upon delivery to an end user, during use by the end user, and as use of the articles is terminated, for example, when the articles are destroyed or otherwise disposed of. The present invention also is directed to systems wherein RFID tags are placed on an article, package, and/or package skid, and then subsequently scanned to verify a desired characteristic, for example, product authenticity, location, etc. Moreover, the present invention is also more specifically directed to methods and systems of monitoring playing card movement in a casino through the use of RFID tags.

In accordance with one embodiment of the present invention, a method of tracking articles for shipment comprises providing at least one article, wherein each article comprises a plurality of subarticles. In accordance with the present invention, an article constitutes the product packaging or container, and a subarticle is defined as the product inside the product packaging or container. The article and subarticle may comprise any article/subarticle combination known to one of ordinary skill in art. In one embodiment, the article and subarticles may comprise a playing card box having a plurality of playing cards therein. The method further comprises applying at least one radio frequency identification (RFID) tag to the article, wherein the article RFID tag stores information regarding the article, the subarticles in the article, or combinations thereof, and then packing the article into a package. The package may comprise any suitable storage medium for the articles, such as a box. In a specific embodiment, at least two, or more specifically a plurality of articles are provided and packed into the package, each having an RFID tag applied thereto.

Subsequently, the method comprises the steps of applying at least one RFID tag to the package, wherein the package RFID tag stores information regarding the package, the articles in the package, the subarticles in each article, or combinations thereof, and then verifying the package and/or articles by scanning the respective RFID tags with at least one RFID verification device configured to read RFID tags. The RFID verification is operable to scan the RFID tags at any point, depending on the user preferences. In a more specific embodiment, at least two packages are packed with articles and each has an RFID tag applied thereto.

In a further embodiment, the method includes placing at least one package containing at least one package RFID tag onto a package skid, and providing the package skid with an RFID tag, wherein the package skid RFID tag stores information regarding the skid, the package located on the skid, the articles in the packages, the subarticles in the articles, or combinations thereof. In a specific embodiment, at least two such packages are loaded onto the package skid. In a further embodiment, the method also includes the loading of at least one package skid containing an RFID tag into a shipping container. The shipping container is defined as any suitable device, for example a box or bin, for holding and supporting the package skid, the package, and/or the articles. The shipping container may be adapted for movement by truck, forklift, boat, plane, etc.

Optionally, the method of the present invention also includes monitoring the location of the packages, and the articles in the packages during packing through at least one RFID verification device configured to scan RFID tags. The method may comprise the steps of scanning all package skid RFID tags loaded in the shipping container, and generating a packing list of all items loaded into the shipping container from the scanned RFID tags. For convenience, the packing list may be attached to the shipping container. It is further contemplated that additional packing lists encompassing the articles in the package could also be generated. In yet another embodiment, the subarticles may also comprise RFID tags in order to facilitate further tracking. The packing list may be in paper form or in an electronic form. A packing list in electronic form may be forwarded electronically to the shipping recipient, in addition to or in place of a packing list accompanying the shipping container.

The RFID tags on the article, the package and/or the package skid are capable of storing numerous types of information. The types of information may include, but are not limited to, information on the seller, buyer, or manufacturer of the article, information regarding article properties, page properties, production of the articles or subarticles, or the like.

The RFID verification devices may comprise any one of the numerous embodiments known to one skilled in the art. In one embodiment, the RFID verification device may comprise RFID portals. Optionally, the RFID verification device may be connected to a computer or similar processing unit. The RFID verification device may be stationary, e.g. coupled to a table, wall, ceiling, etc., of a store or warehouse. The RFID verification device may also be portable, and possibly even a handheld device.

The RFID tag may be coupled to the articles, packages, or package skids via any suitable means known to one of ordinary skill in the art. In accordance with one embodiment of the present invention, the RFID tags may be inserted into the article, and/or the package, for example, by providing a separate marker embedded in a sheet of paper into an article, or package. Moreover, the RFID tags may also be adhesively affixed to the article, package, or package skid. For example, the RFID tag may comprise a surface coating of epoxy or other glue adhesive enabling the tag to be affixed to an article, package, or package skid. In accordance with a further embodiment of the present invention, the RFID tags, through the use of its adhesive, may seal the article or package. In yet another embodiment, the RFID tags may be printed onto the article, package, or package skid. Alternatively, the RFID tags may be injection molded into the article, package, or package skid. This may be especially applicable for embodiments wherein the article, package or package skid comprise plastic or corrugated material.

In a further embodiment as shown in FIG. 1, the RFID tags may facilitate tracking of boxes 10 of playing cards 8 during and prior to shipment. As stated above, the article and subarticles dispersed therein may comprise a playing card box 10 and playing cards 8 contained within the box 10. The playing card box 10 may, for example, comprise one deck, or multiple decks of shuffled or unshuffled playing cards 8. A traditional deck typically comprises 52 cards; however, other decks, such as pinochle or bridge decks, may comprise more or less cards than 52 in a deck, respectively. In one embodiment, the playing card box 10 typically holds about 1 to about 8 decks of playing cards 8; however, it is also contemplated that the article could contain more than 8 decks or partial decks, i.e. less than 1 one deck. In one embodiment, the multiple decks of unshuffled playing cards 8 in the playing card box 10 may be in the form of individually wrapped decks within the playing card box 10. A playing card box 10 comprising at least one deck of playing cards 8 therein has an RFID tag 12.

Further as shown in FIG. 1, the playing card boxes 10 may then be placed in a package 20. The package 20 may comprise an RFID tag 22, wherein the RFID tag 22 is operable to store information 5 regarding the package 20, the playing card boxes 10 contained inside the package 20, and the playing cards 8 contained inside the playing card boxes 10. The packages 20 comprising the playing card boxes 10 and an RFID tag 22 may then be placed on a package skid 30, wherein the package skid 30 may comprise an RFID tag 32 operable to store information regarding the packages 20 placed thereon. After loading the packages 20 onto package skids 30, the package skids 30 may be loaded into a shipping container 40 for subsequent transport to a location, such as a casino.

The RFID tags on the playing card boxes, packages, and package skids are operable to store various types of information. According to one embodiment of the invention, the RFID tags on the article and/or the package may store information relating to the shuffle of the playing cards, the content of the playing cards, and/or the count of the playing cards. Obviously, unshuffled decks will not store information on how the cards were shuffled and in what order; however, the RFID tag, when read, may indicate that the article comprises an unshuffled deck or decks. Optionally, the RFID tags on the article, the package, or the package skid may also store information on the weight of the cards.

The RFID tags suitable for use in the invention may comprise any of numerous embodiments known to one of ordinary skill in the art. In one embodiment, the RFID tag may comprise an antenna and a chip, wherein the antenna is configured to receive a signal from the RFID verification device, and the chip is configured to store information and to provide the stored information to the RFID verification device when the antenna receives the signal. Additional RFID tag embodiments may include conductive ink, nanowires, or electromagnetic receivers. These further embodiments may be adapted to operate without utilizing chips. For instance, the Gershenfeld U.S. Pat. No. 6,724,310 discloses an RFID tag suitable for use in the invention and comprising an electromagnetic receiver defined by a plurality of non-equivalent current pathways. When the RFID tag receives a signal, each of the non-equivalent current pathways respond differently to the signal, and this collective response corresponds to the information provided by the RFID tag.

In accordance with another embodiment, a method for tracking articles upon delivery to an end user comprises receiving from a shipping container at least one package skid. Each package skid comprises at least one package, each package comprises a plurality of articles, and each article comprises a plurality of subarticles therein, wherein the package skid, the packages, and the articles each comprise at least one radio frequency identification (RFID) tag. The method further comprises the steps of scanning the package skid RFID tag on each package skid removed from the shipping container with an RFID verification device configured to scan RFID tags, scanning the package RFID tag on each package removed from the scanned package skid with an RFID verification device configured to scan RFID tags, and scanning the article RFID on each article removed from the scanned package with an RFID verification device configured to scan RFID tags.

Figure 2:
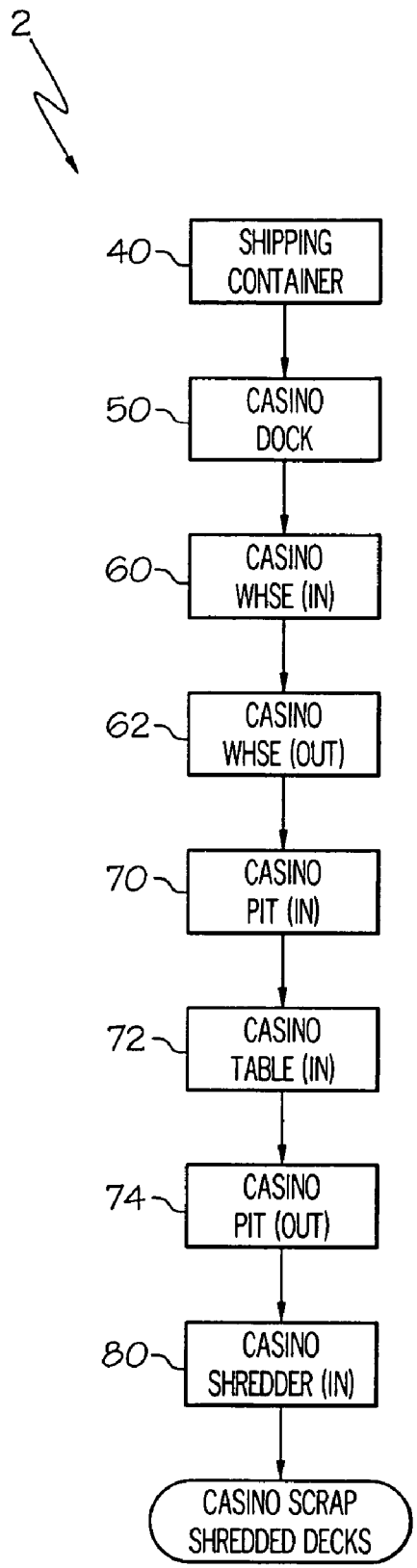
FIG. 2 is a flow chart illustrating the tracking of playing cards using RFID tags at a casino location, according to one or more embodiments of the present invention.

In a further embodiment of the method as shown in FIG. 2, a shipping container 40 comprising package skids 30 with numerous packages 20 of playing card boxes 10 is provided to a casino unloading station, such as a casino dock 50. The casino dock 50 may comprise an RFID verification device operable to scan RFID tags, typically an RFID tag on a package skid 30. At the casino dock 50, the packages 20 may be removed from the package skid 30, for example, after the package skid 30 has been scanned. Subsequently, the packages 20 may be transported to a casino warehouse entrance 60. In one embodiment, the casino warehouse exit 60 and entrance 62 may comprise RFID verification devices operable to scan RFID tags on a package 20, or on a playing card box 10 after the box 10 is removed from the package 20. In a specific embodiment, the warehouse entrance 60 RFID verification device scans RFID tags 22 on packages 20, and the warehouse exit 62 RFID verification device scans RFID tags 12 on playing card boxes 10 after boxes 10 are unloaded from packages 20. In a further embodiment, the playing card boxes 10 may be delivered to card room 64 for storage prior to the cards being delivered to the casino pit entrance 70.

Optionally, the playing card boxes 20 are then delivered to a casino pit entrance 70, wherein the casino pit encompasses the game area including the tables. The casino pit entrance 70 may comprise an RFID verification device operable to scan RFID tags 12 on playing card boxes 12 entering the casino pit. Furthermore, the playing card box 10 may be delivered to a casino table 72, wherein the box 10 may be scanned with an RFID verification device in the vicinity of the casino table 72. A further embodiment of the playing card monitoring method involves scanning the RFID tag 12 on the playing card box 10 prior to or as the playing card box 10 and/or the playing cards 8 are discarded, for example, by destroying in a casino shredder 80, with an RFID verification device configured to scan RFID tags. Optionally, the cards may be delivered to a card room 76 for storage prior to shredding. In one embodiment, the card room 76 may store the boxes 10 of cards 8 for a specific period, for example 7 days, to provide players a period of time to appeal the results of card games played with those playing cards 8.

In a further embodiment of the invention, the RFID verification devices, at the various locations, may be operable to scan an employee identification card comprising an RFID tag of an employee removing a package skid, package, or article from the shipping container, package skid, or package, respectively. Thus, the RFID verification devices monitor not only the articles, packages, and package skids, but also monitors persons handling the articles, packages, and package skids. The present methods and systems thereby facilitate monitoring the chain of possession of a package skid, package, and/or article at a user location. Moreover, the method may also include a step of comparing the information from the scanned articles, scanned packages, and/or scanned package skids to corresponding items on a packing list, generated upon the packing of the shipping container to confirm that all items on the packing list have been received. Additional embodiments may include steps of scanning each article RFID tag on each article with an RFID verification device configured to scan article RFID tags as the article, or subarticles therein, are put into use, and/or scanning the article RFID tag on each article, as the article or subarticles therein are removed from use, for example when the articles and/or subarticles are discarded or destroyed.

In addition to methods of tracking using RFID tags, the present invention also comprises systems for monitoring playing cards in a casino. The system comprises a casino unloading RFID verification device operable to scan an RFID tag on a package skid 30, which contains packages of playing card boxes 10 having playing cards 8 therein. The RFID verification device scans a package skid 30 as the package skid 30 is removed from a shipping container 40 and received at a casino unloading location. Typically, the unloading station is a casino dock 50; however, additional unloading stations are contemplated.

The system also comprises a casino warehouse verification device operable to scan an RFID tag on a package skid, package and/or playing card boxes entering or exiting a casino warehouse. The casino warehouse may comprise RFID verification devices configured to scan RFID tags at the casino warehouse exit 60 and entrance 62, in addition to other conceivable locations in the warehouse. The system may also comprise a casino pit 70 RFID verification device operable to scan an RFID tag on a playing card box 10 entering or exiting a casino pit, and a casino table 72 RFID verification device, wherein the RFID verification device is operable to scan an RFID tag on a playing card box 10 as playing cards 8 are removed from a playing card box 10 and put into use. The system further comprises a destruction RFID verification device, for example, a shredder 80, operable to scan an RFID tag on a playing card box 10 prior to or as the playing card box 10 is destroyed.

The RFID verification devices may comprise at least one portal. The casino table 72, which generally is located inside the casino pit, may comprise at least one portal RFID verification device in the vicinity of the table. In a specific embodiment, the casino table 72 RFID portal is mounted underneath the table. After the playing cards are discarded at a table, the casino pit exit 74 may comprise a verification device operable to scan an RFID tag on the discarded playing card box 10 as the playing cards 8 and/or playing card box 10 exit the casino pit.

In accordance with another embodiment of the present invention, a radio frequency identification (RFID) system is provided. The RFID system comprises a package skid comprising an RFID tag, wherein the package skid RFID tag is operable to be scanned by an RFID verification device configured to scan RFID tags, at least one package located on the package skid and comprising an RFID tag, wherein the package RFID tag is operable to be scanned by an RFID verification device configured to scan RFID tags, and at least one article located in the package and comprising an RFID tag, wherein the article RFID tag is operable to be scanned by an RFID verification device configured to scan RFID tags. In addition to the multiple layers of RFID tags, the system may also comprise bar codes, serial tracking numbers, human readable identifiers, or combinations thereof on the package skid, the package, and/or the article.

The methods and systems of the present invention are advantageous, especially in industries such as the gaming industry. Fraud and/or tampering, for example, though the use of counterfeit playing cards, creates demand for assurances of quality, authenticity in the playing cards. The systems and methods described above, enable articles, such as playing cards, to be tracked from production of the cards until the cards are destroyed at a casino, or other end user, and also may record which persons have handles the articles. By tracking until destruction, casinos ensure that cards are not reused after the cards have become frayed or warped though use. Moreover, the RFID tags store information about the playing cards, so that a user may scan an RFID tag on a playing card and verify any desired information, for example, the playing card count, that the cards contain no visual imperfections or markings, etc. Additional advantages of the systems are further contemplated.

It is noted that terms like "specifically," "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of tracking containers of playing cards for shipment, comprising the steps of:
    providing at least one container of playing cards, wherein the playing card container comprises a plurality of playing cards;
    applying a radio frequency identification (RFID) tag to the playing card container, wherein the playing card container RFID tag stores information regarding the playing card container, the playing cards in the playing card container, or combinations thereof;
    packing the playing card container into a package;
    applying at least one RFID tag to the package, wherein the package RFID tag stores information regarding the package, the playing card container in the package, the playing cards in the playing card container, or combinations thereof; and
    verifying the package and/or playing card containers by scanning the respective RFID tags with at least one RFID verification device configured to read RFID tags.

2. A method according to claim 1, wherein at least two playing card containers are provided and packed into the package, and each playing card container comprises a plurality of playing cards and has playing card container RFID tag applied thereto.

3. A method according to claim 2 further comprising monitoring the location of the package and the playing card containers in the package during packing through at least one RFID verification device configured to scan RFID tags.

4. A method according to claim 2, further comprising:
    placing the at least one package containing at least one package RFID tag onto a package skid; and
    providing the package skid with an RFID tag, wherein the package skid RFID tag stores information regarding the skid, the package located on the skid, the playing card containers in the packages, the playing cards in the playing card containers, or combinations thereof.

5. A according to claim 4, wherein at least two packages are placed on the package skid, each package contains at least two playing card containers, which each have a playing card container RFID tag applied thereto, and each package has a package RFID tag applied thereto.

6. A method according to claim 5, further comprising loading at least one package skid containing an RFID tag into a shipping container.

7. A method according to claim 6, wherein at least two package skids, each containing an RFID tag, are loaded into the shipping container.

8. A method according to claim 6, further comprising scanning all package skid RFID tags loaded in the shipping container, and generating a packing list of all items loaded into the shipping container from the scanned RFID tags.

9. A method according to claim 8, wherein the packing list is attached to the shipping container.

10. A method according to claim 4, further comprising providing RFID tags to the playing cards.

11. A method according to claim 4, wherein the RFID tags on the playing card container, the package and/or the package skid store information regarding production of the playing card container.

12. A method according to claim 4, wherein the playing card container RFID tags are inserted into the playing card container, and/or the package RFID tag is inserted into the package.

13. A method according to claim 4, wherein the respective RFID tags are adhesively affixed to the playing card container, package, package skid, or combinations thereof.

14. A method according to claim 13, wherein the respective RFID tags seal the playing card container, package, or combinations thereof.

15. A method according to claim 4, wherein the respective RFID tags are printed onto the playing card container, package, or package skid.

16. A method according to claim 4, wherein the respective RFID tags are injection molded into the playing card container, package, or package skid.

17. A method according to claim 4, wherein each RFID tag comprises an antenna and a chip, wherein the antenna is configured to receive a signal from the RFID verification device, and the chip is configured to store information and to provide the stored information to the RFID verification device when the antenna receives the signal.

18. A method according to claim 4, wherein the RFID tags comprise conductive ink, nanowires, or electromagnetic receivers.

19. A method of tracking containers of playing cards for shipment, comprising the steps of:
   providing at least two containers of playing cards, wherein each playing card container comprises a plurality of playing cards;
   applying a radio frequency identification (RFID) tag to each playing card container, wherein each playing card container RFID tag stores information regarding each playing card container, the playing cards in each playing card container, or combinations thereof;
   packing each playing card container into a package;
   applying at least one RFID tag to the package, wherein the package RFID tag stores information regarding the package, each playing card container in the package, the playing cards in each playing card container, or combinations thereof; and
   verifying the package and/or playing card containers by scanning the respective RFID tags with at least one RFID verification device configured to read RFID tags.

20. A method according to claim 19, wherein each playing card container comprises one deck, or multiple decks of shuffled of unshuffled playing cards disposed therein.

21. A method according to claim 20, wherein the multiple decks of unshuffled playing cards in the playing card container are packed in individually wrapped decks.

22. A method according to claim 19, wherein the RFID tag on the playing card containers and/or the package store information relating to shuffle of the playing cards, content of the playing cards, and/or count of the playing cards.

23. A method according to claim 19, wherein the RFID tags on the playing card containers, or the packages, store information on the weight of the cards.

24. A method for tracking containers of playing cards upon delivery to an end user, comprising the steps of:
   receiving from a shipping container at least one package skid, wherein each package skid comprises at least one package, each package comprises a plurality of playing card containers, and each playing card container comprises a plurality of playing cards therein, wherein the package skid, the packages, and the playing card containers each comprise at least one radio frequency identification (RFID) tag;
   scanning the package skid RFID tag on each package skid removed from the shipping container with an RFID verification device configured to scan RFID tags;
   scanning the package RFID tag on each package removed from the scanned package skid with an RFID verification device configured to scan RFID tags; and
   scanning the playing card container RFID on each playing card container removed from the scanned package with an RFID verification device configured to scan RFID tags.

25. A method according to claim 24, further comprising scanning an employee identification card comprising an RFID tag of an employee removing a package skid, package, or playing card container from the shipping container, package skid, or package, respectively.

26. A method according to claim 24, further comprising a step of comparing the information from the scanned playing card containers, and/or scanned packages, or scanned package skids to corresponding items on a packing list generated upon the packing of the shipping container to confirm that all items on the packing list have been received.

27. A method according to claim 24, further comprising scanning each playing card container RFID tag on each playing card container with an RFID verification device configured to scan RFID tags as the playing card container, or playing cards therein, are put into use.

28. A method according to claim 24, further comprising scanning each playing card container RFID tag on each playing card container with an RFID verification device configured to scan RFID tags as the playing card container or playing cards therein are discarded or destroyed.

29. A method for monitoring playing card movement in a casino, comprising the steps of:
   providing at least one playing card box comprising at least one deck of playing cards therein, wherein the playing card comprises at least one radio frequency identification (RFID) tag; and
   scanning the RFID tag on the playing card box as the playing cards are delivered to a casino table with an RFID verification device configured to scan RFID tags.

30. A method according to claim 29, further comprising scanning the RFID tag on the playing card box prior to or as the playing card box and/or the playing cards are discarded with an RFID verification device configured to scan RFID tags.

31. A method according to claim 29, further comprising scanning the RFID tag on the playing card box prior to delivering the playing card box to the casino table.

32. A system for monitoring playing cards in a casino, comprising:
   a casino unloading radio frequency identification (RFID) verification device operable to scan an RFID tag on a package skid containing packages of playing card boxes having playing cards therein, as a package skid is removed from a shipping container and received at a casino unloading location;
   a casino warehouse RFID verification device operable to scan an RFID tag on a package skid, package and/or playing card boxes entering and/exiting a casino warehouse;
   a casino pit RFID verification device operable to scan an RFID tag on a playing card box entering or exiting a casino pit;
   a casino table RFID verification device, wherein the RFID verification device is operable to scan an RFID tag on a playing card box as playing cards are removed from a playing card box and put into use; and a destruction RFID verification device operable to scan an RFID tag on a playing card box prior to or as the playing card box is destroyed.

33. A system as defined in claim 32, wherein the RFID verification devices are further operable to scan employee RFID badges.

34. A system as defined in claim 32, wherein the RFID verification device comprises at least one portal.

35. A system as defined in claim 32, wherein the casino table RFID verification device comprises a portal in the vicinity of a casino table.

36. A system as defined in claim 32, wherein the casino pit RFID verification device is operable to scan an RFID tag on a discarded playing card box as the playing cards and/or playing card box exit the casino pit.

37. A radio frequency identification (RFID) system comprising:

a package skid comprising an RFID tag, wherein the package skid RFID tag is operable to be scanned by an RFID verification device configured to scan RFID tags;

at least one package located on the package skid and comprising a package RFID tag, wherein the package RFID tag is operable to be scanned by an RFID verification device configured to scan RFID tags; and at least one playing card container located in the package and comprising a playing card container RFID tag, wherein the playing card container RFID tag is operable to be scanned by an RFID verification device configured to scan RFID tags.

38. A system as defined in claim 37, wherein the package skid, the package, and/or the playing card container further comprise bar codes, serial tracking numbers, human readable identifiers, or combinations thereof.

* * * * *